3,170,907
PRODUCTION OF CIS-1,4 POLYBUTADIENE WITH A NICKEL CARBOXYLIC ACID SALT-BORON TRIFLUORIDE ETHERATE - ALUMINUM TRIALKYL CATALYST
Kenichi Ueda, Akira Onishi, Toshio Yoshimoto, Junichi Hosono, and Katsuhiko Maeda, all of Yokohama, Japan, assignors to Bridgestone Tire Company Limited, Tokyo, Japan
No Drawing. Filed Dec. 28, 1960, Ser. No. 78,808
Claims priority, application Japan, Dec. 31, 1959, 34/41,518
6 Claims. (Cl. 260—94.3)

This invention relates to a process for the conversion of butadiene to a solid butadiene polymer having a high content of cis-1,4 configuration by contact with a catalyst system consisting of (A) a nickel-salt of an organic acid, (B) a boron trifluoride etherate and (C) an organometallic compound of aluminum.

One object of our invention is to provide a novel and highly useful catalyst system for the preparation of a solid butadiene polymer having a high content of cis-1,4 configuration from butadiene. Another object is to provide a relatively low temperature, low pressure process for the polymerization of butadiene in substantial yields to form a solid butadiene polymer having a high content of cis-1,4 configuration. There are three known methods for manufacturing polybutadiene having a high content of cis-1,4 configuration as follows:

(1) Phillips Process, which is a polymerization process using catalyst consisting of trialkyl aluminum and titanium tetraiodide.

(2) Hüls Process, which is a polymerization process using catalysts consisting of triisobutylaluminum and titanium tetrabromide.

(3) Montecatini Process, which is a polymerization process using catalysts consisting of a compound of a metal of group VIII of the Periodic Table such as cobaltous chloride and an organometallic compound such as diethylaluminum chloride.

Recently in U.S. Patent No. 2,922,782, there is described a new catalyst system for polymerization of ethylene consisting of (1) a compound of a metal of group IV, V or VI of the Periodic Table, (2) an organoaluminum compound and (3) a boron halide, thereby using the boron halide to reduce the molecular weight of the polymer compared with that obtained when the boron halide is omitted.

As described above, two-component catalysts are used in the known processes for producing cis-1,4 polybutadiene. In the first or second known method, the cis content of polybutadiene produced seems to be at most 94% or 85% respectively. In the third known method a little higher cis content is obtained by the polymerization of butadiene at temperatures lower than about 20° C. but the cis content decreases considerably as the temperature becomes higher. This seems to mean that the control of exothermic polymerization reaction of butadiene is difficult when highly active catalysts are used. Furthermore, such active catalysts tend to give gel in diolefin polymerization.

In short, even a most representative two-component catalyst is still unsatisfactory in several points such as cis content or gel content of polymer obtained, polymerization activity and available temperature range for cis-1,4 polymerization. There seems to be no help for improving such points by using two-component catalyst.

In the course of our research to find a suitable process for producing high cis-1,4 polybutadiene, we came to such conclusion and could surmount such difficulties for the first time by our novel three component catalyst system.

The main improvements accomplished by the three-component catalysts of this invention are as follows: (1) Polybutadiene containing about 97% or more of cis-1,4 configuration and free from gel can be obtained by said catalyst systems. (2) The catalysts of this invention have high activity. (3) By said catalyst system the polymerization can be effected over broad range of polymerization temperature without any substantial change of cis content of the produced polymer. Thus it is clear that the three components are indispensable in order to obtain a new catalyst system having such new abilities which are essentially different from those of the catalyst consisting of two components selected from the above mentioned three components. In this invention, we use nickel-salts of organic acid as the A component and trialkylaluminum compounds as C components, but the two-component catalyst prepared by mixing the A and C components is found to be unsatisfactory in some difficulties such as mentioned previously. For instance nickel naphthenate triethylaluminum catalyst has no substantial activity for polymerization of butadiene.

In the case of B–C combination similar difficulties arise.

It was known that boron trifluoride in conjunction with an organometallic compound has power of catalyst to polymerize butadiene, but nevertheless their powers are generally weak, the molecular weight of the polymer obtained is low or the microstructure of polymer is rich in trans-1,4 configuration. It has been already described that three-component catalyst comprising boron trihalide is used for polymerization of monoolefin, thereby the boron halide serving for reducing the molecular weight of the polymer compared with that obtained when the boron halide is omitted. It is unexpectable and very important that we can obtain a novel and useful three-component catalyst which is very suitable for producing high cis-1,4 polybutadiene and has additional and essentially different abilities compared with the abilities of the catalyst consisting of two components selected from said three components.

Briefly, the process of this invention comprises the conversion of butadiene in substantial yields to solid polymers having a high content of cis-1,4 configuration, by contacting butadiene with a catalyst system consisting of three components: (A) a compound selected from the group consisting of the nickel-salts of an organic acid such as nickel naphthenate, nickel octenate, nickel stearate and nickel benzoate, (B) boron trifluoride etherate, (C) a substance selected from the group consisting of organometallic compounds of aluminum such as triethylaluminum. We prefer to use the compounds which are described above as examples because they are commercially available and relatively cheap, and also they give highly cis orientating efficient catalysts.

The catalyst system is generally prepared by mixing three components in an inert atmosphere in a suitable diluent. If necessary to modify the catalytic function of said catalyst system, aging or heat-treating of the system may be carried after prepared.

The contacting of butadiene with a catalyst system is effected at temperatures within the range of about −30° C. to about 150° C., preferably about 0° C. to about 80° C., in liquid phase, under a pressure sufficient to maintain the reaction system in liquid phase and under an inert atmosphere. It is desirable to use a suitable diluent which serves both as a reaction medium and a solvent for the solid reaction products, and benzene is generally used for this purpose. In some cases, however, suitable reaction media which do not dissolve the polymer produced may be used successfully for effecting suspension polymerization because some of the catalysts of this invention are suitable for the process, pentane, diisopropyl ether etc. are generally used for this purpose. Polymerization can be also carried out without any diluent because the excess monomer acts as a diluent.

Polymerization is effected by using butadiene, substantially free of catalyst poisons or polymerization inhibitors, but saturated hydrocarbons are substantially harmless to polymerization. The polymers of butadiene prepared by the method of this invention are usually rubbery solids or semi-solids having intrinsic viscosities of about 0.6 to about 5.0. The polymers also have high contents of cis-1,4 configuration of usually 90 to 97% and under suitable conditions more than 97%.

In this invention, microstructures were determined according to the infrared spectroscopic analysis proposed by Morero (La Chimica e L'industria, 41,758 (1959)). Intrinsic viscosities were determined in toluene at 25° C. Gel contents of these polymers are usually small when measured by filtering their solution in benzene with 200 mesh wire gauze while they were substantially zero in the polymers obtained by catalyst system containing boron trifluoride etherate as a B component. The A component of the catalyst of this invention is nickel salts of an organic acid and they are classified as follows: a nickel-salt of aliphatic-, aromatic-, alicyclic-, carboxylic acids having 1–20 carbon atoms, for example, nickel formate, nickel acetate, nickel naphthenate, nickel benzoate, nickel palmitate, nickel octenate, nickel oxalate, nickel ethylbenzoate, and the like compounds.

With nickel salts of organo-carboxylic acids, the activity of cis-1,4 polymerization is more or less varied by the kinds of organic acid. We prefer to use a salt selected from the group consisting of nickel naphthenate, nickel octenate, nickel palmitate, nickel stearate and nickel benzoate, because they afford efficient and high-cis orientating catalyst. The B component of the catalyst used for the method of this invention is boron trifluoride etherate because it forms the catalyst which provides high molecular weight polybutadiene having a high content of cis-1,4 configuration usually containing no gel in substantial yields.

The C component of the catalyst to be used for the method of this invention is a trialkylaluminum compound, for instance, triethylaluminum, tributylaluminum, triisobutylaluminum. By selecting each component from the preferable compounds above mentioned and combining them, preferable three-component catalysts can be obtained such as: nickel naphthenate-boron trifluoride etherate-triethylaluminum or triisobutylaluminum, nickel octenate-boron trifluoride etherate-triethylaluminum or triisobutylaluminum, nickel stearate-boron trifluoride etherate-triethylaluminum or triisobutylaluminum, nickel benzoate-boron trifluoride etherate-triethylaluminum or triisobutylaluminum, nickel palmitate-boron trifluoride etherate-triethylaluminum or triisobutylaluminum and nickel formate-boron trifluoride etherate-triethylaluminum or triisobutylaluminum. When the three-component catalysts are prepared by mixing the A, B and C components the mixing order, mixture ratio, concentrations and mixing temperature of these components and other various factors have influence on the catalytic activity. Among these conditions the mixing order and the mixture ratio are the most important factor. The mole ratio of the C component to the B component is usually within the range of about 0.1 to about 5.0 for a definite A component.

The preferable mole ratio of the C component to the B component is a little varied by the kind and amount of the A component, but it is generally within the range of about 0.3 to about 1.5.

The mole ratio of the A component to the C component is usually within the range of about 0.03 to about 7.0 for a definite B component. But the preferable mole ratio of the A component to the C component is generally within the range of about 0.05 to about 1.5.

The three-component catalysts having such an activity for cis-1,4 polymerization have intimate relation to the mixture ratio of three components A, B and C and the adding order, and by the selection of the optimum condition it is possible to prepare a three component catalyst which is so active as to make impossible to stir the mixture within 5–10 minutes after starting the polymerization.

Generally, there is a certain range of mole ratios of trialkylaluminum to boron trifluoride etherate for a given organic carboxylic acid nickel salt for the catalyst to have a considerably high activity. It is preferable to effect the polymerization at less than mole ratio 5 to 1 of nickel salt to trialkylaluminum at a certain mole ratio of trialkylaluminum to boron trifluoride etherate. For example, if the three-component catalyst is prepared by using nickel naphthenate as the A component, boron trifluoride etherate as the B component and triethylaluminum as the C component, the maximum activity can be obtained at a point between 0.7 and 1.4 of mole ratio of $Al/BF_3$ and the polymer having cis content of more than 98% can be produced at a mole ratio between 1.5 and 2.5 by polymerizing 21 g. of butadiene by means of 1 g. of nickel naphthenate and 2.46 mmoles of triethylaluminum at a reaction temperature of 40° C. and the reaction time of 1.5 hours. The result shows that the mole ratio of triethylaluminum to boron trifluoride etherate has great influence on the activity. Further, by selecting a proper concentration of each component, a suitable mole ratio and the preparation temperature of the catalyst, dispersed corpuscular catalysts or soluble catalysts can be prepared. This is one of the characteristics of the catalyst of this invention and makes the catalyst have high polymerization activity and gives reproducible results.

The three-component catalyst can be prepared even at low temperature if each component is reactive or soluble in a suitable solvent. Catalytic activity is not so much influenced by the small variations of the catalyst preparation or polymerization temperature, but it is preferable to employ a low catalyst preparation temperature in order to obtain high catalytic activity and high molecular weight polymer. As the catalyst preparation temperature becomes higher, the catalytic activity decreases and the gel content of the obtained polymer increases.

The catalyst system is prepared by admixing said three components in an anhydrous liquid hydrocarbon diluent generally at a temperature between about −50° C. and about 80° C., preferably about −5° C. and about 40° C.

When the catalyst of this invention is stored at room temperature, the activity does not decrease so markedly as Ziegler catalyst. When the catalysts are stored at −5° C., the activity does not change for a few hours. Boron trifluoride etherate is the most preferable to obtain the high molecular weight polymer. The cis-1,4 contents of butadiene polymers do not vary so much over a wide range of variations of the catalyst preparation, and this is one of the advantageous features of the catalyst of this invention. Of course, large excess of the B and C components tends to decrease the cis-1,4 content of the polymers.

The ratio of the amount of the catalyst to that of butadiene is not specially limited in this invention. In the respresentative catalyst systems only 1 mmole of the C component against 1 mole of the monomer is sufficient to produce polybutadiene in substantial yield.

It is desirable to minimize the introduction of water, oxygen, alcohol and acid into contact with the catalyst, but the effect of these materials on the polymerization activity and cis-1,4 orientating activity of the catalyst system is not so sensitive as that of Ziegler-type catalyst.

Diluent is generally used to control the polymerization easily. The ratio of the amount of diluent to that of the monomer is not so critical, but usually it is within 40 by volume.

The diluents and solvents of the catalyst are aromatic hydrocarbons such as benzene, toluene, a xylene and analogous substances thereto; aliphatic hydrocarbons such as propane, butane, pentane, hexane, heptane, benzine, and similar substances thereto; alicyclic hydrocarbons such as cyclohexane, Decalin and similar substances thereto; hydrogenated aromatic hydrocarbons such as tetraline and similar substances thereto and diisopropyl ether.

Aromatic hydrocarbons such as benzene, toluene, xylenes are preferable for solution polymerization process. Pentane, butane, diisopropyl ether and the like are preferable for suspension polymerization process.

Solvents or diluents should be substantially free of catalyst poisons or polymerization inhibitors such as oxygen, water, alcohol and the like to effect polymerization efficiently.

Purification of solvents can be carried out by general known methods.

The separation of catalyst from the polymer can be done by a following simple manner which is a characteristic of the present catalyst.

After the reaction, if necessary, a solvent containing a few percent of phenyl-$\beta$-naphthylamine is added to dissolve the polymer completely or to lower the viscosity of the reaction mixture and the mixture is poured into a large quantity of nonsolvent, such as methanol, isopropyl alcohol, or methanol-acetone to precipitate the polymer. For instance, the polymer prepared with the three-component catalyst consisting of nickel naphthenate, boron trifluoride etherate and triethylaluminum has dark color because of the remained catalyst but it changes to a colorless polymer gradually by washing it several times with methanol.

After refining the polymer in this manner only, ash content in the polymer is 0.2 to 0.6%. If necessary, by sheeting or cutting the polymer the washing effect is further increased.

As the catalyst of this invention has high activity, it is effective to the synthesis of cis-1,4 polybutadiene with a very small quantity. As the catalyst is soluble in suitable solvents which do not dissolve the polymer, such as, alcohol, acetone and the like, the catalyst is separated very easily from the polymer by washing with the above mentioned solvents. When pure polymer is not necessary it can be used without specially eliminating the catalyst as its content is very small and harmless.

The mechanism of cis-1,4 polymerization with the catalyst of this invention is not yet perfectly clear, but it is certain that each of the A, B and C components takes part jointly of the synthesis of cis polybutadiene and it seems that each of the components has special main function, i.e., the A component mainly serves to the cis-1,4 orientation of butadiene and the B component serves to increase the molecular weight of cis-1,4 polybutadiene, while the C component effects together with the B component mainly to provide catalytic activity.

*Example 1*

0.2 g. of nickel naphthenate was introduced into a pressure bottle and then dissolved in 30 ml. of dry benzene. With stirring the solution of nickel naphthenate by a magnetic stirrer, a solution of 0.14 g. of etherate of boron trifluoride etherate in 10 ml. of anhydrous benzene was added slowly drop-by-drop to the solution. After the addition the stirring was continued for 5–10 minutes to react thoroughly nickel naphthenate and boron trifluoride etherate. To the mixture was added dropwise slowly a solution of 0.14 g. of triethylaluminum in 10 ml. of anhydrous benzene. It took about 20 minutes to prepare the catalyst. The catalyst thus obtained was cooled to −70° C. by Dry Ice-methanol, and added with 20 g. of liquefied butadiene under a reduced pressure, and resulting mixture was subjected to polymerization by shaking for 45 minutes in a thermostat at 40° C. After completing the polymerization, unreacted butadiene was expelled and the residue was diluted with benzene containing an antioxidant. The solution was poured into methanol to precipitate the polymer and then the polymer was washed with methanol several times to remove the catalyst. The polymer was a rubbery solid and the microstructure was determined in carbon disulfide according to the method proposed by Morero. The intrinsic viscosity of the polymer was measured at 25° C. in toluene and the following results were obtained.

Yield of polymer _____ g__ 18.2
Intrinsic viscosity [$\eta$] _____ 2.75
Cis-1,4 _____ percent__ 97.4
Trans-1,4 _____ do____ 2.4
Vinyl _____ do____ 0.3

Other polymerizations were effected by varying the amounts of nickel naphthenate, triethylaluminum and boron trifluoride etherate and obtained the following results:

Butadiene: 21 g.
Reaction temperature: 40° C.

| Test No. | Nickel naphthenate (g.) | Triethylaluminum (mmoles) | Borontrifluoride (mmoles) | Polymerization time (hr.) | Polymer yield (g.) | Microstructure (percent) | | | [$\eta$] |
|---|---|---|---|---|---|---|---|---|---|
| | | | | | | cis-1,4 | trans-1,4 | Vinyl | |
| 1 | 1 | 2.46 | 24.6 | 1.5 | 6.5 | 95.3 | 4.1 | 0.5 | 0.85 |
| 2 | 1 | 2.46 | 12.3 | 1.5 | 10.8 | 95.7 | 4.6 | 0.1 | ----- |
| 3 | 1 | 2.46 | 2.73 | 1.5 | 21.0 | 94.6 | 5.3 | 0.1 | ----- |
| 4 | 1 | 2.46 | 2.05 | 1.5 | 19.8 | 96.7 | 3.0 | 0.3 | 2.70 |
| 5 | 1 | 2.46 | 1.29 | 1.5 | 2.8 | 98.5 | 1.4 | 0.1 | 2.90 |
| 6 | 1 | 2.46 | 1.29 | 1.6 | 11.6 | 98.8 | 1.1 | 0.1 | ----- |
| 7 | 1 | 2.46 | 1.23 | 1.5 | 1.3 | 97.3 | 2.6 | 0.1 | ----- |
| 8 | 1 | 2.46 | 0.82 | 1.5 | 1.4 | 95.7 | 3.8 | 0.5 | ----- |
| 9 | 1 | 4.90 | 2.62 | 2.5 | 3.6 | 97.9 | 1.6 | 0.5 | 3.58 |
| 10 | 0.5 | 2.46 | 1.31 | 1.6 | 4.6 | 96.3 | 2.4 | 1.3 | 4.48 |
| 11 | 0.2 | 1.23 | 1.37 | 0.75 | 17.7 | 97.4 | 2.4 | 0.3 | ----- |
| 12 | 0.2 | 3.00 | 3.33 | 0.75 | 21.0 | 95.5 | 3.3 | 1.2 | ----- |
| 13 | 0.1 | 1.23 | 1.37 | 1.0 | 18.7 | 97.3 | 2.0 | 0.7 | ----- |
| 14 | 0.1 | 1.23 | 3.08 | 1.0 | 21.0 | 95.5 | 3.6 | 0.9 | ----- |
| 15 | 1 | 2.46 | 0 | 17.0 | 0 | ----- | ----- | ----- | ----- |
| 16 | 1 | 1.23 | 0 | 17.0 | 0 | ----- | ----- | ----- | ----- |

Tests Nos. 15 and 16 show the results of polymerization with the binary catalyst consisting of triethylaluminum and nickel naphthenate.

*Example 2*

The polymerizations were effected by similar manner to that as described in Example 1 except using nickel stearate, nickel palmitate and nickel octenate and the following results were obtained.

Butadiene: 21 g.   Reaction temperature: 40° C.

| Test No. | Organic nickel salts (g.) | Triethyl-aluminum- (mmoles) | Boron trifluoride (mmoles) | Polymerization time (hr.) | Polymer yield (g.) | Microstructure (percent) | | | $[\eta]$ |
|---|---|---|---|---|---|---|---|---|---|
| | | | | | | cis-1,4 | trans-1,4 | Vinyl | |
| 1 | Nickel stearate 0.5 | 2.46 | 1.31 | 1 | 6.7 | 97.8 | 1.9 | 0.3 | 4.68 |
| 2 | Nickel stearate 0.2 | 2.46 | 2.73 | 1 | 21.0 | 96.4 | 3.2 | 0.4 | |
| 3 | Nickel palmitate 0.2 | 2.46 | 2.73 | 2 | 19.0 | 96.0 | 3.0 | 1.0 | |
| 4 | Nickel octenate 0.5 | 2.46 | 2.73 | 1.0 | 19.2 | 97.9 | 1.8 | 0.3 | |
| 5 | Nickel octenate 0.2 | 2.46 | 2.73 | 1.5 | 3.6 | 98.5 | 1.3 | 0.2 | |
| 6 | Nickel octenate 0.1 | 2.46 | 2.73 | 1 | 20.4 | 97.6 | 1.0 | 0.4 | |
| 7 | Nickel octenate 0.1 | 1.23 | 1.37 | 2 | 3.2 | 98.0 | 1.7 | 0.3 | |

Example 3

The similar tests for polymerization were effected with nickel benzoate and obtained the following results.

Butadiene: 21 g. Reaction temperature: 40° C.

| Test No. | Nickel salts (g.) | Triethyl-aluminum (mmoles) | Boron trifluoride (mmoles) | Polymerization time (hr.) | Polymer yield (g.) | Microstructure (percent) | | | $[\eta]$ |
|---|---|---|---|---|---|---|---|---|---|
| | | | | | | cis-1,4 | trans-1,4 | Vinyl | |
| 24 | Nickel benzoate 0.5 | 2.46 | 2.73 | 1.5 | 7.0 | 98.4 | 1.4 | 0.2 | 2.56 |
| 25 | Nickel benzoate 0.2 | 2.46 | 2.73 | 1.5 | 21.0 | 96.4 | 2.6 | 1.0 | |

Example 4

Using nickel naphthenate as the A component and the polymerization reaction was effected according to the method as described in Example 1. The polymerization conditions and the results were as follows:

Nickel naphthenate _____ 0.1 g.
Triethylaluminum _____ 1.23 mmoles.
Polymerization temperature _____ 40° C.
Polymerization time _____ 1 hour.
Butadiene _____ 21 g.

| Test No. | Catalyst preparation temp. (° C.) | Al/BF₃ mole ratio | Yields of polymer (g.) | Intrinsic viscosity $[\eta]$ | Microstructure (percent) | | |
|---|---|---|---|---|---|---|---|
| | | | | | cis | trans | Vinyl |
| 1 | 10 | 0.9 | 20.1 | 3.36 | 97.4 | 1.5 | 1.1 |
| 2 | 10 | 0.4 | 20.3 | 2.00 | 95.8 | 2.4 | 1.8 |
| 3 | 20 | 0.9 | 19.2 | 3.34 | 96.5 | 2.0 | 1.5 |
| 4 | 60 | 0.9 | 12.7 | 3.58 | 96.1 | 2.2 | 1.7 |
| 5 | 80 | 0.9 | 12.6 | | 95.7 | 2.4 | 1.9 |

Example 5

Using nickel naphthenate as the A component and the polymerization reaction was effected according to the method as described in Example 1. The polymerization conditions and the results were as follows:

Polymerization time _____ hour__ 1
Polymerization temperature _____° C__ 60
Nickel naphthenate _____ g__ 0.2
Butadiene _____ g__ 21

| Test No. | Triethyl-aluminum (mmoles) | Al/BF₃ mole ratio | Yields of polymer (g.) | Microstructure (percent) | | |
|---|---|---|---|---|---|---|
| | | | | cis | trans | Vinyl |
| 1 | 2.46 | 0.9 | 20.25 | 97.8 | 1.2 | 1.0 |
| 2 | 1.23 | 0.9 | 20.6 | 96.9 | 2.2 | 0.9 |
| 3 | 2.46 | 1.2 | 19.0 | 97.4 | 1.3 | 1.3 |

Example 6

Using nickel naphthenate as the A component and the polymerization reaction was effected in an autoclave according to the method as described in Example 2. The polymerization conditions and the results were as follows:

Solvent: benzene
Triethylaluminum/boron trifluoride etherate (mole ratio): 0.9

| Test No. | Solvent (ml.) | Butadiene (ml.) | Polymerization temp. (° C) | Polymerization time (hr.) | Triethylaluminum (mmoles) | Nickel naphthenate (g.) | Yields of polymer (percent) | Microstructure (percent) | | |
|---|---|---|---|---|---|---|---|---|---|---|
| | | | | | | | | cis | trans | Vinyl |
| 1 | 1,370 | 280 | 80 | 6 | 8.2 | 0.83 | 71.0 | 96.7 | 1.6 | 1.8 |
| 2 | 1,337 | 820 | 60 | 1 | 32.7 | 2.36 | 85.0 | 95.5 | 2.5 | 2.0 |
| 3 | 1,728 | 530 | 30 | 6 | 11.3 | 1.13 | 85.0 | 96.8 | 1.5 | 1.7 |
| 4 | 1,778 | 545 | 20 | 2.5 | 26.1 | 1.7 | 95.0 | 97.1 | 1.8 | 1.0 |

What we claim is:

1. A process for manufacturing cis-1,4 polybutadiene, which comprises: polymerizing butadiene in the presence of hydrocarbon diluent, at a temperature between about −30° C. and about 150° C., under a pressure sufficient to maintain the reaction system in liquid phase and under an inert atmosphere to a solid polymer having at least 70% cis-1,4 structure by contacting butadiene with a catalyst obtained by effecting reaction through mixing at a controlled temperature the three components consisting of (A) an organic carboxylic acid salt of nickel of the formula

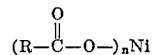

wherein R is a hydrocarbon radical, and $n$ is the valence of nickel, (B) boron trifluoride etherate and (C) trialkylaluminum, the mole ratio of said trialkylaluminum to said boron trifluoride etherate being within the range of 0.1 to 5.0, and the mole ratio of said nickel salt to said trialkylaluminum being within the range of 0.03 to 7.0.

2. A process for manufacturing cis-1,4 polybutadiene, which comprises: polymerizing butadiene in the presence of hydrocarbon diluent, at a temperature between about −30° C. and about 150° C., under a pressure sufficient to maintain the reaction system in liquid phase and under an inert atmosphere to a solid polymer having at least 70% cis-1,4 structure and substantially no gel, by contacting butadiene with a catalyst obtained by effecting reaction through mixing at a controlled temperature the three components consisting of (A) an organic carboxylic acid salt of nickel of the formula

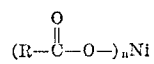

wherein R is a hydrocarbon radical, and $n$ is the valence of nickel, (B) boron trifluoride etherate and (C) trialkylaluminum, the mole ratio of said trialkylaluminum to said boron trifluoride etherate being within the range of 0.1 to 5.0 and the mole ratio of said nickel salt to said trialkylaluminum being within the range of 0.05 to about 1.5.

3. A process according to claim 1, wherein said organic carboxylic acid salt of nickel is selected from the group consisting of nickel naphthenate, nickel octenate, nickel stearate, nickel palmitate and nickel benzoate.

4. A process according to claim 1, wherein said boron trifluoride etherate is boron trifluoride ethyletherate.

5. A process according to claim 1, wherein said trialkylaluminum is triethylaluminum.

6. A process according to claim 1, wherein said hydrocarbon diluent is selected from the group consisting of benzene, toluene and xylene.

References Cited by the Examiner
UNITED STATES PATENTS

| | | | |
|---|---|---|---|
| 2,521,022 | 9/50 | Rowland | 260—94.7 |
| 2,882,264 | 4/59 | Barnes | 260—94.9 |
| 2,953,554 | 9/60 | Miller et al. | 260—94.3 |
| 2,965,626 | 12/60 | Pilar | 260—94.3 |
| 2,964,627 | 12/60 | Field et al. | 260—94.3 |
| 2,970,134 | 1/61 | Anderson | 260—94.3 |
| 2,977,349 | 3/61 | Brockway | 260—94.3 |
| 3,066,126 | 11/62 | Porter et al. | 260—94.3 |
| 3,066,127 | 11/62 | Carlson et al. | 260—94.3 |
| 3,094,514 | 6/63 | Tucker | 260—94.3 |

FOREIGN PATENTS

| | | |
|---|---|---|
| 837,251 | 6/60 | Great Britain. |
| 580,103 | 12/59 | Belgium. |
| 1,215,953 | 11/59 | France. |
| 594,618 | 6/59 | Italy. |

OTHER REFERENCES

Advanced Organic Chemistry, G. W. Wheland, John Wiley & Sons, Inc., 1949 ed., page 80 relied upon.

JOSEPH L. SCHOFER, *Primary Examiner.*

L. H. GASTON, M. LIEBMAN, WILLIAM H. SHORT, *Examiners.*